Patented July 6, 1937

2,086,215

UNITED STATES PATENT OFFICE 2,086,215

PROCESSES FOR BREAKING PETROLEUM EMULSIONS

Melvin De Groote, St. Louis, Mo., assignor to The Tret-O-Lite Company, Webster Groves, Mo., a corporation of Missouri No Drawing. Application December 24, 1936, Serial No. 117,583

15 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The reagent or demulsifying agent contemplated for use in my process consists of a chemical compound or composition of matter obtained by reacting an aliphatic unsaturated hydrocarbon containing at least 8 carbon atoms and having a double bond at the end of the chain, with a strong sulfonating agent, without subsequent hydrolysis.

The unsaturated hydrocarbons employed as raw material in the manufacture of the demulsifying agent used in my process may be any aliphatic unsaturated hydrocarbons containing 8 or more carbon atoms and having a double bond at the end of the chain. Mixtures of such hydrocarbons may be employed. Or, the starting materials may be mixtures containing unsaturated hydrocarbons of the above described character and olefines in which the double linkage is not at the end of the chain. In general, more effective demulsifying agents are obtained when derived largely or entirely from hydrocarbons having a double linkage at the end of the chain. The aliphatic unsaturated hydrocarbons may be of the straight or branch chain type. Generally speaking, the straight chain hydrocarbons having a single bond at the end of the chain are preferred. Hydrocarbons of this kind may be obtained in any suitable manner, for example, by dehydrating the primary alcohols obtained by hydrogenating fatty acids or their esters, e. g. those found in palm oil, tallow, coconut oil and olive oil. Branch chain unsaturated hydrocarbons suitable for use as a raw material in preparation of the demulsifying agent used in the present process may be obtained in any desirable manner, for example, by polymerizing short chain olefines or by dehydrating synthetic higher alcohols or mixtures thereof, e. g. those produced by the hydrogenation of carbon oxides under elevated temperatures and pressures. Where branch chain hydrocarbons are employed the most effective demulsifying agents are obtained from those having the shortest side chains.

As previously stated, the unsaturated hydrocarbons, or mixtures thereof, should be reacted with strong sulfonating agents. By the expression "strong sulfonating agents" is meant sulfonating agents of greater sulfonating power than 100% sulfuric acid. Included among such sulfonating agents are compounds which per se have a greater sulfonating power than 100% sulfuric acid, such as, for example, sulfur trioxide, chlorsulfonic acid, bromsulfonic acid, oleum and acetyl sulfuric acid. In practice, it is preferable to employ this class of sulfonating agents, and especially desirable results have been obtained with chlorsulfonic acid. Where sulfur trioxide is employed, it may be introduced into the reaction mixture either in gaseous, liquid or solid form. As examples of other strong sulfonating agents may be mentioned milder sulfonating agents such as sulfuric acid in combination with reagents capable of removing water from the reaction mass, such as, for example, acetyl chloride, glacial acetic acid, acetic anhydride, propionic acid, propionic anhydride, phosphorous pentoxide, phosphorous oxychloride and boric anhydride. If desired, dehydrating agents may be employed in connection with the sulfonating agents which in themselves are strongly sulfonating, viz. sulfur trioxide, chlorsulfonic acid, oleum and the like, but there appears to be very little added advantage in such a procedure.

The proportions of the sulfonating agents may vary within relatively wide limits depending largely upon the nature of the reactants. In general, it is preferable to employ about 1 to 2 moles of sulfonating agent for each double bond per mole of an unsaturated hydrocarbon. In certain cases, however, it may be desirable to use larger or smaller proportions of the sulfonating agent, it being understood that the desired reaction proceeds whether a small or large amount of sulfonating agent is employed.

The sulfonation may be effected in a solvent or suspension medium, that is to say, a medium which is liquid at the temperature of the reaction and is inert to the reactants or does not affect the reaction unfavorably. As examples of solvent or suspension media one may mention carbon tetrachloride, ethylene dichloride, trichlorethylene, tetrachlorethane, chloroform, liquid sulfur dioxide, diethylether, acetic anhydride, propionic acid and propionic anhydride. Generally speaking, it is preferable to employ carbon tetrachloride. Solvent or suspension media are especially desirable when the sulfonating agent is sulfur trioxide.

The time allowed for the sulfonation to take place will depend largely upon the nature of the reactants and the conditions of temperature. Under ordinary operating conditions it may vary from about 2 to 48 hours. If desired, the sulfonation may be carried on almost indefinitely. In practice, therefore, it is customary to carry out this reaction until further sulfonation has little if any effect on the results obtained.

While the temperature maintained in effecting the sulfonation may vary within relatively wide limits, the temperature employed should preferably be below that giving rise to decomposition, resinification, or polymerization of the reactants and products. In general it is preferable to maintain the temperatures in this step of the process below about 50° C. and preferably within the range of about −10 to +30° C. Ordinarily higher temperatures tend to yield darker products, and also to cause the liberation of sulfur dioxide.

It is apparent that there is variation in the course of reactions, depending upon whether or not sulfuric acid or the like is used as differentiated from other materials, such as chlorsulfonic acid, bromsulfonic acid, etc.

A probable course of the reactions occurring when chlorsulfonic acid is reacted upon a higher olefine having a single double bond at the end of the chain in the presence of a chlorinating catalyst may be illustrated by the following equations, in which R represents a saturated hydrocarbon radical containing at least 6 carbon atoms:

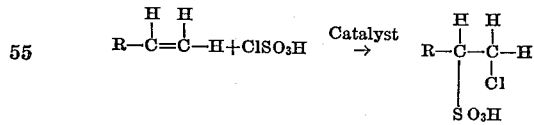

Another probable course of the reactions is as follows:

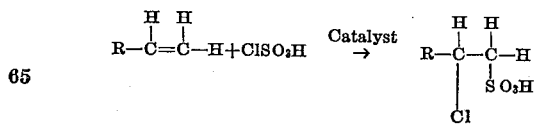

However, in the use of sulfuric acid compounds free from halogens, it is quite possible that the reaction proceeds somewhat differently. This is especially true if the early stages of sulfonation are conducted at as low a temperature as possible. Under such conditions the tendency of the reaction is to form an acid sulfate rather than a sulfonic acid. Such reactions may be indicated as follows:

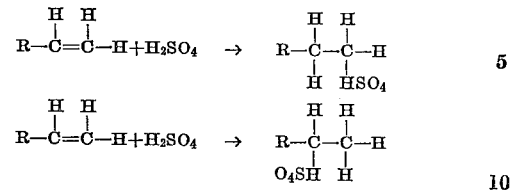

Further reaction with the sulfuric acid compound may then result in an actual sulfonation as differentiated from a sulfation, as indicated by the following reactions:

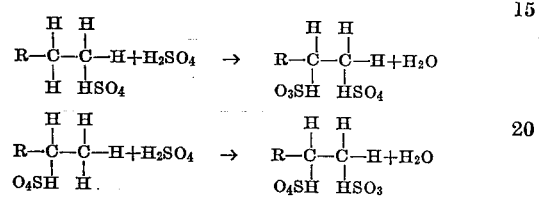

The general procedure above described for the manufacture of these compounds is well known. The above description of the manufacturing procedure is found in substantially verbatim form in one or more of the following U. S. patents: #2,061,617 November 24, 1936, Downing and Clarkson; #2,061,618 November 24, 1936, Downing and Clarkson; #2,061,619 November 24, 1936, Downing and Clarkson; #2,061,620 November 24, 1936, Downing and Clarkson.

It is to be pointed out, however, that such patents are concerned largely with the use of materials obtained by subjecting sulfonation products of the kind described to a subsequent hydrolytic action so that the halogen, chlorine or bromine, as the case may be, for example, or the acid sulfate radical or its equivalent is replaced by a hydroxyl radical.

The demulsifying agents employed in the present process are obtained by the same general procedure so far as sulfonation is concerned, but the products of sulfonation are not subjected to subsequent hydrolysis. The sulfonation mass may be used as such, that is, in the acidic state, or may be used after neutralization with a convenient base, such as caustic soda, caustic potash, ammonia, various amines, such as amylamine, diamylamine, triamylamine, ethanolamine, diethanolamine, triethanolamine, butylamine, benzylamine, cyclohexylamine, etc. The higher molecular weight amine salts generally exhibit oil solubility and sometimes exhibit both oil and water solubility. One may prepare salts by neutralization with calcium oxide, magnesium oxide, barium oxide, and the like. Similarly, one may prepare heavy metal salts, such as iron salts, copper salts, lead salts, etc. If desired, the sulfonic acids may be converted into the corresponding esters by conversion into the sulfonchloride followed by subsequent reaction with a suitable alcohol, such as methyl alcohol, ethyl alcohol, propyl alcohol, butyl alcohol, cyclobutanol cyclohexanol, benzyl alcohol, and the like. Insofar as the sulfonic acids themselves are corrosive, it is most desirable to use the materials in the form of the salts, such as the sodium, ammonium and potassium salts, and particularly in the form of amine salts, such as alkylolamine salts.

It may be well to point out that sulfonation may take place, if desired, in the presence of a suitable catalyst, such as certain inorganic oxides and silver salts as described in U. S. Patent #2,061,620 aforementioned, or in the presence of a chlorinating catalyst, as described in U. S. Patent #2,061,619 mentioned above. Various catalysts include the oxides and salts of antimony, copper, manganese, iron, vanadium, aluminum, alkali metal iodides, free iodine, silver salts, silver oxides, etc.

The following examples illustrate methods of preparing the demulsifying agents employed in the present process.

*Example 1*

30 parts of a mixture of olefines (B. P. 245-260° C.) consisting substantially of 1,2-hexadecylene, prepared by dehydrating the appropriate fraction of primary alcohols (B. P. 190-225° C. at 65 mm.) obtained from the hydrogenation of coconut oil, are dissolved in 125 parts of carbon tetrachloride and the mixture cooled to 0° C. 20 parts of chlorsulfonic acid are then added slowly with vigorous stirring and the mixture kept cold for 3 hours. The reaction liquid is then further cooled to approximately 5-10° C., and an amount of ice water added equal in volume to the chlorsulfonic acid employed during sulfonation. Separation is permitted to take place and the waste acid withdrawn. The acidic mass is then neutralized slowly by the addition of just sufficient caustic potash to make the material show an alkaline reaction to methyl orange indicator. The carbon tetrachloride is then steam distilled off and recovered. The residual product is then ready for use, and, if desired, may be dehydrated by vacuum distillation.

*Example 2*

20 parts of 1-2-octadecylene (B. P. 180-205° C. at 30 mm. Bromine No. 64.7) obtained by dehydrating substantially pure primary n-octadecyl alcohol are dissolved in about 80 parts of carbon tetrachloride. Approximately one-tenth part of mercurous sulfate is suspended in the solution which is then cooled to about 0-5° C. 12 parts of chlorsulfonic acid are added slowly to the mixture with agitation, the resultant mixture being maintained at the above low temperature for a period of about 2 more hours. At the end of this time the temperature is allowed to rise to about 20-25° C. After standing at this temperature for about 12 to 14 hours, the liquid is poured into an amount of ice water equal in volume to the chlorsulfonic acid employed, mixed thoroughly and allowed to stand until separation takes place. The waste acid water is withdrawn and the acidic mass is neutralized with 20% caustic potash solution until just sufficient caustic potash has been added to make the solution neutral to methyl orange indicator. The product is distilled to remove the carbon tetrachloride. The resultant solution is evaporated under reduced pressure of approximately 40 to 60 mm. until a substantially solid or pasty material is obtained.

*Example 3*

The same procedure is followed as in Example 1 except that triethanolamine is employed for neutralization.

*Example 4*

The same procedure is followed as in Example 2 except that triethanolamine is employed for neutralization.

My preferred reagent is prepared in the manner described in Examples 3 and 4 and mixed with a suitable solvent, such as benzol, alcohol, or water, or mixture of the same, so as to give a demulsifying agent of low viscosity containing at least 50% of the sulfo-organic compounds.

It so happens that the chemical constitution of the sulfonation products obtained in accordance with the general procedure outlined above, and described in greater detail in the aforementioned U. S. Patents, #2,061,617, #2,061,618, #2,061,619 and #2,061,620, has not been definitely determined and this is especially true in regard to the sulfonation products as such without being subjected to a subsequent hydrolytic procedure. For this reason it is impossible to describe the demulsifying agents employed in the present process completely and specifically in terms of their exact composition. It is apparent that the reaction products employed are such that the compounds obtained are largely hydrogen sulfate sulfonic acid derivatives or halogen sulfonic acid derivatives of aliphatic hydrocarbons in which a hydrogen sulfate group or a halogen atom and a sulfonic acid residue occur on the last 2 carbon atoms of an aliphatic chain having 8 or more carbon atoms. It is not known whether the sulfonic acid group or the hydrogen sulfate group or halogen atom occur on the alpha carbon atom of the hydrocarbon chain. Possibly the products may be isomeric mixtures of compounds in which the sulfonic acid residue occurs on the alpha carbon atom and those which occur on the beta carbon atom depending upon the specific sulfonating agent used, the unsaturated hydrocarbons acted upon, the presence or absence of specific sulfonating agents, the presence or absence of branch chains, variations in conditions of sulfonation, etc.

If the unsaturated hydrocarbon reacted upon has an unsaturated bond at the end of the hydrocarbon chain and also on another portion of the chain, it is possible that a hydrogen sulfate group or a halogen atom and a sulfonic acid group will be introduced into this unsaturated bond also.

It is understood, therefore, that even in the absence of information as to the complete composition of the materials thus obtained, one can properly say that the demulsifying agents of the kind contemplated for use in the present process include specifically hydrogen sulfate sulfonic acids and halogen sulfonic acids of aliphatic hydrocarbons (as well as their salts or esters) in which a hydrogen sulfate group or a halogen group and a sulfonic acid residue occur on the last 2 carbon atoms of an aliphatic chain containing 8 or more carbon atoms and preferably derived from sources having 20 or 30 carbon atoms in the chain. In the halogen sulfonic acids, the halogen atom may be considered as being a residue from a halogen hydride.

It will be recalled, however, that certain sulfonations of the kind previously described may employ such materials as acetylsulfuric acid, propionylsulfuric acid, etc. or sulfonations may be conducted in presence of certain other acids or their anhydrides, such as boric acid and phosphoric acid. If acetylsulfuric acid is employed, the product obtained may be indicated by the following formula:

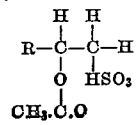

Acetic acid is a member of the water-soluble fatty acid series. It is not a fatty acid in the sense that it is derived from an ordinary oil or fat, but simply is so designated for purposes of organic chemical nomenclature. The water-soluble fatty acids include acetic acid, propionic acid and their homologues, including members having not over 6 carbon atoms. It is obvious that in the above formula one might replace the acetic acid residue by a residue derived from a higher homologue, such as a propionic acid residue, etc. Similarly, in the case of those formulas where an acid sulfate is present, one might have a borate or phosphate radical, or an acid borate or an acid phosphate radical present. Similarly, the sulfonic acid need not be present as a free acid but might be present in the form of a salt or ester. Therefore, in the broadest concept the materials of the kind present may be indicated by the type formula:

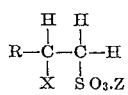

in which X is a hydrolyzable acid residue derived from the class of acids consisting of sulfuric acid, phosphoric acid, boric acid, halogen hydrides, and water-soluble fatty acids; and Z is an ionizable hydrogen atom equivalent.

It is to be noted that the symbol X indicates a hydrolyzable acid residue, which in some instances may contain an ionizable hydrogen atom. This may be true when X is a residue derived from a polybasic acid such as sulfuric acid, phosphoric acid, etc. Naturally such an ionizable hydrogen atom may be replaced in the same manner as the ionizable hydrogen atom of the sulfonic acid group. It may be replaced by a metallic atom or by an organic radical. The same sort of reactions may be employed as described previously in regard to the ionizable hydrogen atom of the sulfonic acid radical. Furthermore, it is evident that reactions involving the conversion of the ionizable hydrogen atom of the sulfonic acid radical would invariably involve an additional ionizable hydrogen atom if present in the residue indicated by the symbol X. For this reason, it is understood that in the claims the expression "X is a hydrolyzable acid residue derived from the class of acids consisting of sulfuric acid, phosphoric acid, boric acid, halogen hydrides, and water-soluble fatty acids" is meant to also include such residue, where an ionizable hydrogen atom has been replaced by a metallic atom, an ammonium radical, a substituted ammonium radical or an organic radical, all of which together with the acidic hydrogen atom itself represent ionizable hydrogen atom equivalents.

Conventional demulsifying agents employed in the treatment of oil field emulsions are used as such, or after dilution with any suitable solvent, such as water, petroleum hydrocarbon, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the chemical compound employed as the demulsifying agent of my process may be admixed with one or more of the solvents customarily used in connection with conventional demulsifying agents. Moreover, said chemical compound may be used alone or in admixture with other suitable well known classes of demulsifying agents, such as demulsifying agents of the modified fatty acid type, the petroleum sulfonate type, the alkaylated sulfoaromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

In practicing my process a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

It is understood that the use of this process is not limited to any particular isomeric form of the chemical compound or compounds disclosed, but that one isomeric form is as suitable as another.

In the claims the expression "sulfonated hydrocarbon body" is intended to refer to the acidic materials obtained by sulfonation as such, or after conversion into salts and esters. The materials are characterized by the primary reactions of manufacture and not by subsequent reactions, such as salt formation where an ionizable hydrogen atom equivalent in one form is converted into another form of the same ionizable hydrogen atom equivalent.

Having thus described my invention, what I claim as new and desire to secure by Letters Patent is:

1. A process for breaking petroleum emulsions of the water-in-oil type, which consists in subjecting the emulsion to the action of a demulsifying agent comprising a sulfonated hydrocarbon body obtained by reacting an aliphatic unsaturated hydrocarbon containing at least 8 carbon atoms and having a double bond at the end of the chain, with a strong sulfonating agent.

2. A process for breaking petroleum emulsions of the water-in-oil type, which consists in subjecting the emulsion to the action of a demulsifying agent comprising a sulfonated hydrocarbon body obtained by reacting an aliphatic unsaturated hydrocarbon containing at least 8 carbon atoms, having a double bond at the end of the chain and free from any side chains, with a strong sulfonating agent.

3. A process for breaking petroleum emulsions of the water-in-oil type, which consists in subjecting the emulsion to the action of a demulsifying agent comprising a sulfonated hydrocarbon body obtained by reacting an aliphatic unsaturated hydrocarbon containing at least 20 carbon atoms and not more than 30 carbon atoms, having a double bond at the end of the chain and free from any side chains, with a strong sulfonating agent.

4. A process for breaking petroleum emulsions of the water-in-oil type, which consists in subjecting the emulsion to the action of a demulsifying agent comprising a chemical compound of the formula type:

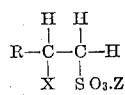

in which R—C—C represents an aliphatic chain having at least 8 carbon atoms, X is an ionizable acid residue derived from the class of acids consisting of sulfuric acid, phosphoric acid, boric acid, halogen hydrides, and water-soluble fatty acids; and Z is an ionizable hydrogen atom equivalent.

5. A process for breaking petroleum emulsions of the water-in-oil type, which consists in subjecting the emulsion to the action of a demulsifying agent comprising a chemical compound of the formula type:

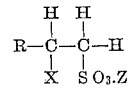

in which R—C—C represents an aliphatic chain having at least 8 carbon atoms, X is an ionizable acid residue derived from the class of acids consisting of sulfuric acid, phosphoric acid, boric acid, halogen hydrides, and water-soluble fatty acids; and Z is an ionizable hydrogen atom equivalent, and further characterized by the fact that the alkyl residue R is free from side chains.

6. A process for breaking petroleum emulsions of the water-in-oil type, which consists in subjecting the emulsion to the action of a demulsifying agent comprising a chemical compound of the formula type:

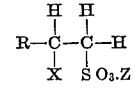

in which R—C—C represents an aliphatic chain having at least 8 carbon atoms, X is an ionizable acid residue derived from the class of acids consisting of sulfuric acid, phosphoric acid, boric acid, halogen hydrides, and water-soluble fatty acids; and Z is an ionizable hydrogen atom equivalent, further characterized by the fact that the alkyl residue R is free from side chains, and additionally characterized by the fact that the total number of carbon atoms present in the aliphatic chain is at least 20 and not over 30.

7. A process for breaking petroleum emulsions of the water-in-oil type, which consists in subjecting the emulsion to the action of a demulsifying agent comprising a chemical compound of the formula type:

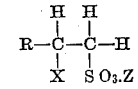

in which R—C—C represents an aliphatic chain having at least 8 carbon atoms, X is a hydrolyzable acid residue derived from sulfuric acid; and Z is an ionizable hydrogen atom equivalent, further characterized by the fact that the alkyl residue R is free from side chains, and additionally characterized by the fact that the total number of carbon atoms present in the aliphatic chain is at least 20 and not over 30.

8. A process for breaking petroleum emulsions of the water-in-oil type, which consists in subjecting the emulsion to the action of a demulsifying agent comprising a chemical compound of the formula type:

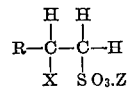

in which R—C—C represents an aliphatic chain having at least 8 carbon atoms, X is a hydrolyzable acid residue derived from phosphoric acid; and Z is an ionizable hydrogen atom equivalent, further characterized by the fact that the alkyl residue R is free from side chains, and additionally characterized by the fact that the total number of carbon atoms present in the aliphatic chain is at least 20 and not over 30.

9. A process for breaking petroleum emulsions of the water-in-oil type, which consists in subjecting the emulsion to the action of a demulsifying agent comprising a chemical compound of the formula type:

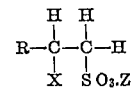

in which R—C—C represents an aliphatic chain having at least 8 carbon atoms, X is a hydrolyzable acid residue derived from a halogen hydride; and Z is an ionizable hydrogen atom equivalent, further characterized by the fact that the alkyl residue R is free from side chains, and additionally characterized by the fact that the total number of carbon atoms present in the aliphatic chain is at least 20 and not over 30.

10. A process for breaking petroleum emulsions of the water-in-oil type, which consists in subjecting the emulsion to the action of a demulsifying agent comprising a chemical compound of the formula type:

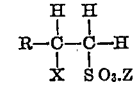

in which R—C—C represents an aliphatic chain having at least 8 carbon atoms, X is a chlorine atom; and Z is an ionizable hydrogen atom equivalent, further characterized by the fact that the alkyl residue R is free from side chains, and additionally characterized by the fact that the total number of carbon atoms present in the aliphatic chain is at least 20 and not over 30.

11. A process for breaking petroleum emulsions of the water-in-oil type, which consists in subjecting the emulsion to the action of a demulsifying agent in the form of a salt, comprising a chemical compound of the formula type:

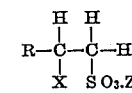

in which R—C—C represents an aliphatic chain having at least 8 carbon atoms, X is a hydrolyzable acid residue derived from sulfuric acid; and Z is an ionizable hydrogen atom equivalent, further characterized by the fact that the alkyl residue R is free from side chains, and additionally characterized by the fact that the total number of carbon atoms present in the aliphatic chain is at least 20 and not over 30.

12. A process for breaking petroleum emulsions of the water-in-oil type, which consists in subjecting the emulsion to the action of a demulsifying agent in the form of a water-soluble salt, comprising a chemical compound of the formula type:

in which R—C—C represents an aliphatic chain having at least 8 carbon atoms, X is a hydrolyzable acid residue derived from sulfuric acid; and Z is an ionizable hydrogen atom equivalent, further characterized by the fact that the alkyl residue R is free from side chains, and additionally characterized by the fact that the total number of carbon atoms present in the aliphatic chain is at least 20 and not over 30.

13. A process for breaking petroleum emulsions of the water-in-oil type, which consists in subjecting the emulsion to the action of a demulsifying agent in the form of a water-soluble amine salt, comprising a chemical compound of the formula type:

in which R—C—C represents an aliphatic chain having at least 8 carbon atoms, X is a hydrolyzable acid residue derived from sulfuric acid; and Z is an ionizable hydrogen atom equivalent, further characterized by the fact that the alkyl residue R is free from side chains, and additionally characterized by the fact that the total number of carbon atoms present in the aliphatic chain is at least 20 and not over 30.

14. A process for breaking petroleum emulsions of the water-in-oil type, which consists in subjecting the emulsion to the action of a demulsifying agent in the form of a water-soluble alkylolamine, comprising a chemical compound of the formula type:

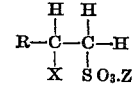

in which R—C—C represents an aliphatic chain having at least 8 carbon atoms, X is a hydrolyzable acid residue derived from sulfuric acid; and Z is an ionizable hydrogen atom equivalent, further characterized by the fact that the alkyl residue R is free from side chains, and additionally characterized by the fact that the total number of carbon atoms present in the aliphatic chain is at least 20 and not over 30.

15. A process for breaking petroleum emulsions of the water-in-oil type, which consists in subjecting the emulsion to the action of a demulsifying agent in the form of a water-soluble triethanolamine salt, comprising a chemical compound of the formula type:

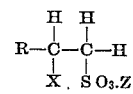

in which R—C—C represents an aliphatic chain having at least 8 carbon atoms, X is a hydrolyzable acid residue derived from sulfuric acid; and Z is an ionizable hydrogen atom equivalent, further characterized by the fact that the alkyl residue R is free from side chains, and additionally characterized by the fact that the total number of carbon atoms present in the aliphatic chain is at least 20 and not over 30.

MELVIN DE GROOTE.